R. LEONARD.
HORSE-POWER.
No. 187,646. Patented Feb. 20, 1877.
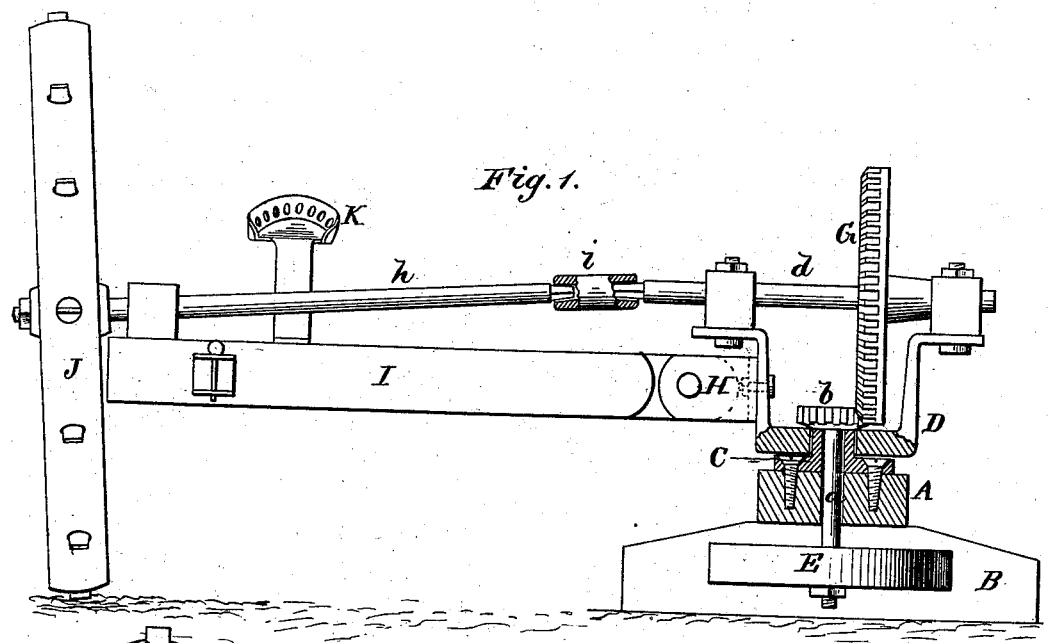
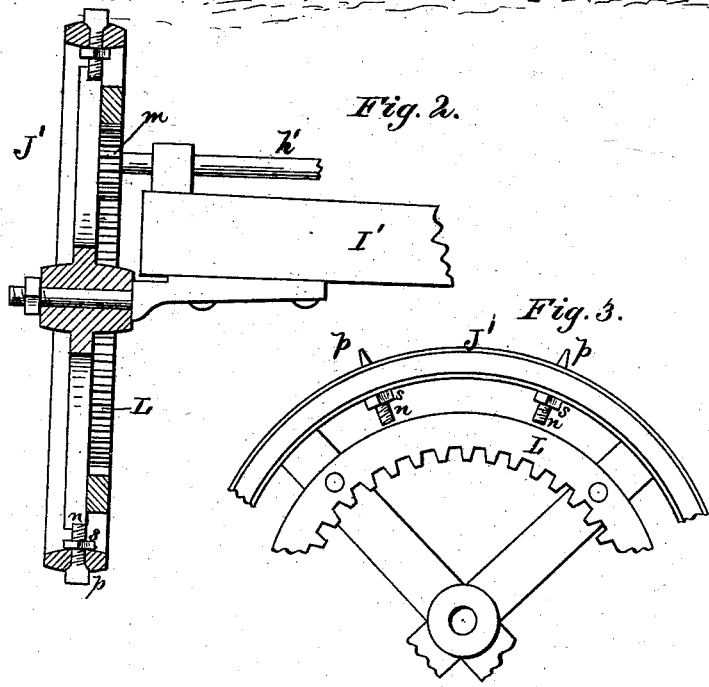
WITNESSES
Henry N. Miller
H. L. Durand
INVENTOR
Ruben Leonard
Alexander Mason
ATTORNEYS.

UNITED STATES PATENT OFFICE.

REUBEN LEONARD, OF OAKLAND MILLS, PENNSYLVANIA.

IMPROVEMENT IN HORSE-POWERS.

Specification forming part of Letters Patent No. 187,646, dated February 20, 1877; application filed January 20, 1877.

*To all whom it may concern:*

Be it known that I, REUBEN LEONARD, of Oakland Mills, in the county of Juniata and in the State of Pennsylvania, have invented certain new and useful Improvements in Horse-Powers; and do hereby declare that the following is a full, clear, and exact description thereof, reference being had to the accompanying drawing, and to the letters of reference marked thereon, making a part of this specification.

The nature of my invention consists in the construction and arrangement of a horse-power, as will be hereinafter more fully set forth.

In order to enable others skilled in the art to which my invention appertains to make and use the same, I will now proceed to describe its construction and operation, referring to the annexed drawing, in which—

Figure 1 is a side view, part in section, of my horse-power. Figs. 2 and 3 are detailed views of parts thereof.

A represents a beam or bed, supported upon suitable feet or end pieces B B, and provided in the center, on the top, with a flanged hub, C, firmly fastened thereto. Through this hub and bed passes a vertical shaft, $a$, provided on its upper end with a pinion, $b$, and on its lower end with a band-wheel, E, around which is to be passed a belt, for connection with the machine to be driven. Instead of this band-wheel I may substitute gears or bevel-gears, so as to form the connection in any suitable manner. Around the hub C is placed a metal frame, D, carrying a horizontal shaft, $d$, upon which is secured a gear-wheel, G, that meshes with the pinion $b$, as shown. The frame D is at one end provided with a clip, H, in which is pivoted the sweep I, said sweep being provided with a box or bearing at its outer end in which a shaft, $h$, is placed. This shaft has a wheel, J, secured to its outer end, and the inner end of the shaft is, by a coupling, $i$, connected with the end of the shaft $d$. The sweep I supports, near its outer end, the driver's seat K, so as to get more weight at the outer end, the team being also connected to the sweep at the outer end. The sweep I and frame D turn around the hub C as a center, and the wheel J rotating, communicates motion through the shafts $h$ and $d$ to the gear-wheel G, and this latter, in turn, rotates the pinion $b$, shaft $a$, and wheel E.

When more speed is required, the sweep I is uncoupled from the clip H, and a similar sweep, I', placed therein. This sweep has a suitable spindle projecting from the under side at the outer end, upon which the wheel J' is placed loosely. To the inner side of the wheel J' is secured an internal cog-wheel, L, which meshes with a pinion, $m$, on a shaft, $h'$, having its bearing in a box on top of the sweep, and the inner end of the shaft is connected to the end of the shaft $d$ by the coupling $i$. The team then going at the same gait, the speed of the wheel E is materially increased.

The large driving-wheels J and J' are provided on their peripheries with flat broad spurs $p\ p$, which have screw-shanks $n\ n$, that are passed through the rim of the wheel, and nuts $s\ s$ then screwed on said shanks fasten the spurs in their places. These spurs take into the ground and prevent the wheel from slipping, but cause it at all times to revolve, and when any spur gets broken it can easily be taken out and another replaced.

This horse-power is simple in construction, durable, easily operated, and not liable to get out of order.

Having thus fully described my invention, what I claim as new, and desire to secure by Letters Patent, is—

1. The combination of the angular metallic frame D, provided with clip H, the detachable pivoted sweep I, shaft $d$, gear-wheel G, flanged hub C, and pinion $b$, on the vertical shaft $a$, all constructed substantially as set forth.

2. The wheel J', with internal cog-gear L, the sweep I', pinion $m$, and shaft $h'$, in combination with the frame D, wheel G, shaft $d$, coupling $i$, shaft $a$, pinion $b$, and flanged hub C, all substantially as and for the purposes herein set forth.

In testimony that I claim the foregoing I have hereunto set my hand this 11th day of January, 1877.

REUBEN LEONARD.

Witnesses:
J. M. MASON,
FRANK GALT.